2 Sheets—Sheet 1.
NAYLOR & WARD.
Grain-Drill
No. 30,832. Patented Dec. 4, 1860.
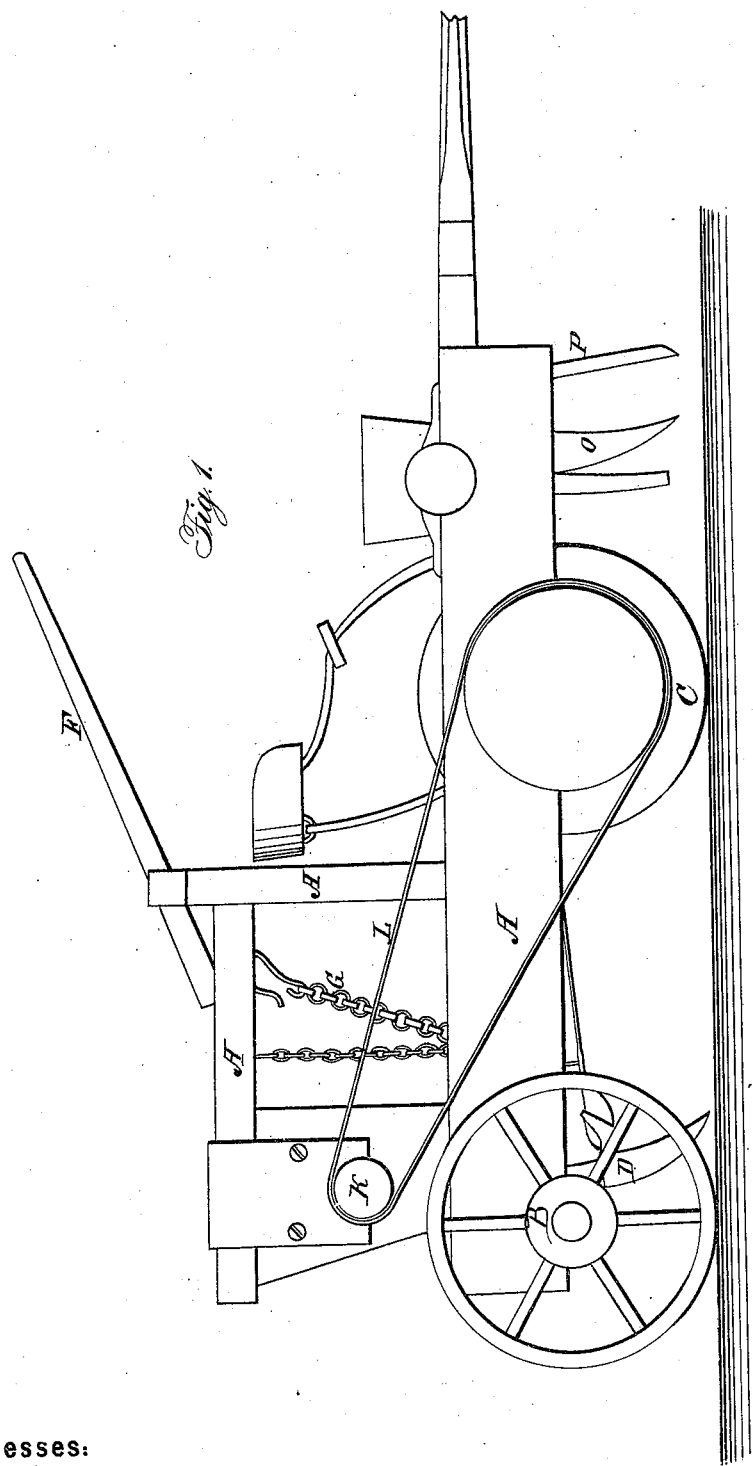
Witnesses:
J. M. Cohn
G. Breed.
Inventor:
Fantly H. Naylor
Armsted Ward
⅞
Daniel Breed
Atty.

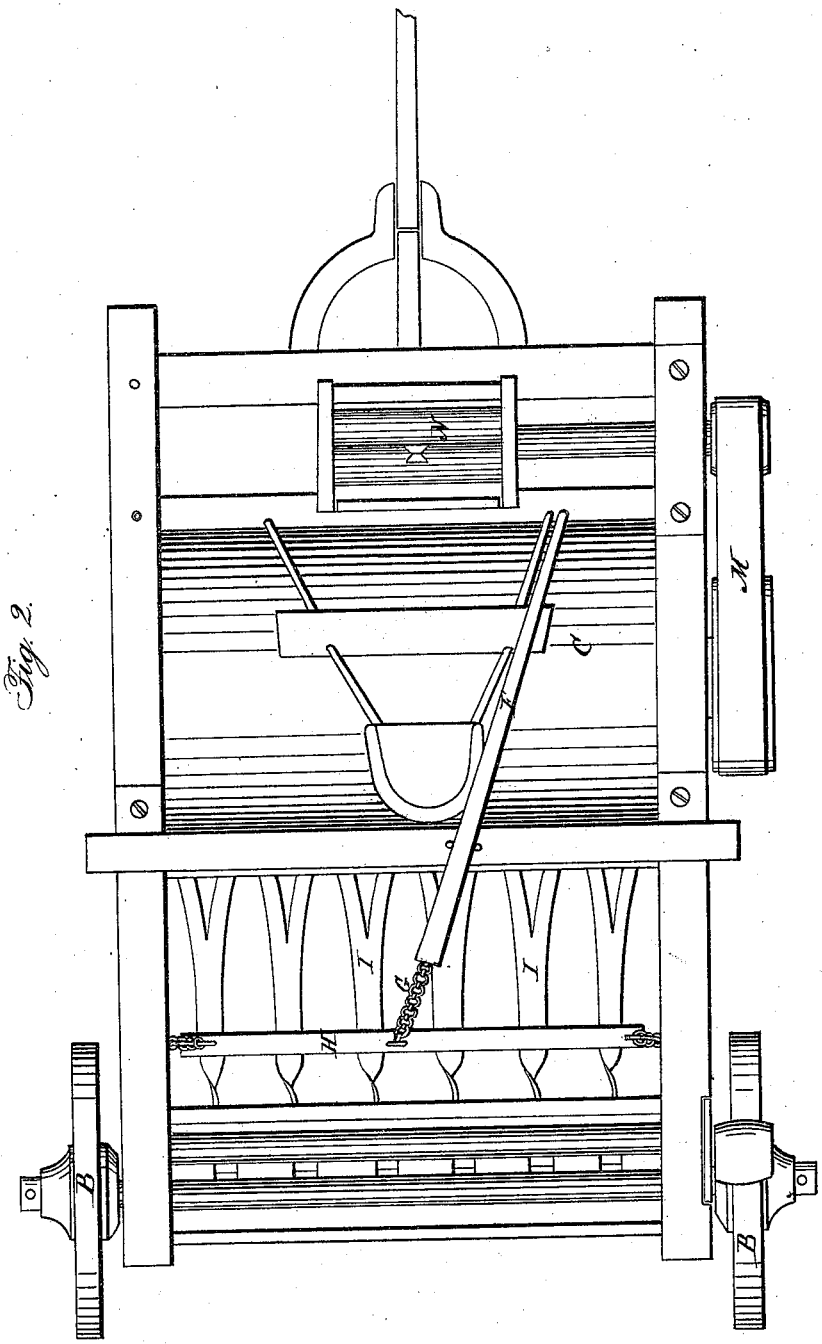

UNITED STATES PATENT OFFICE.

FANTLEY H. NAYLOR AND A. WARD, OF NILES TOWNSHIP, DELAWARE COUNTY, INDIANA.

IMPROVEMENT IN SEEDING-MACHINES.

Specification forming part of Letters Patent No. 30,832, dated December 4, 1860.

*To all whom it may concern:*

Be it known that we, FANTLEY H. NAYLOR and ARMSTID WARD, of Niles township, in the county of Delaware and State of Indiana, have invented a new and useful Improvement in a Combined Drill-Roller and Corn-Planter; and I do hereby declare that the following is a full and exact description thereof, reference being had to the accompanying drawings, and to the letters of reference marked thereon.

Our invention consists in a peculiar construction, arrangement, and combination of seed planter and roller.

In the accompanying drawings, Figure 1 is a side view of our machine. Fig. 2 is a top view of the same.

The frame A of our machine may be of any suitable construction. The rear end of the frame is supported on two wheels, B, in the ordinary manner. The forward part of the machine rests upon the roller C, which is placed at some distance from the end of the frame A. This roller may be hollow, if that construction be preferred.

On the rear end of frame A is arranged a series of drill-tubes, D, corresponding to the seed-passages e, Fig. 2, in the seed-box E. These drill-tubes D can be raised or lowered at pleasure by means of the lever F and chains G, acting through bar H and arms I. The feed-roller K is operated by the band L, which derives motion from the roller C. This feed-roller K is provided with feed-cups in the usual manner. All these drill-tubes and other devices used for drilling may be removed from the machine by unbolting the same whenever it is desired to use the machine as a planter merely. This renders the machine lighter for hill-planting. With such change of the machine the band L is removed, and another band, M, Fig. 2, is put upon the machine, so as to give motion to the planting feed-roller N, Fig. 2, which is provided with cups in the usual manner.

The plow or opener O travels in front to open the ground for dropping the corn, and the roller C follows to cover the seed. A cutter, P, is placed in front of the plow O to cut the sod and clear the track for the plow.

We usually make the roller C three and a half feet in length, and so arrange the speed of the feed-roller that the corn will be planted; but the details of our machine may be somewhat varied, so long as it is substantially the same as a whole.

We are aware that drills and rollers combined, and also planters and rollers combined, are not new; but we believe that the machine above described is new and an improvement in seed-planters.

Having thus fully described our invention, what we claim, and desire to secure by Letters Patent of the United States, is—

The arrangement and combination of the above-described drill, roller, and planter, the whole being constructed and operating substantially as set forth.

FANTLEY H. NAYLOR.
ARMSTID WARD.

Witnesses:
THOMAS N. EDGINGTON,
LEMUEL E. WASSON.